United States Patent [19]

Naruse et al.

[11] Patent Number: 4,761,533

[45] Date of Patent: Aug. 2, 1988

[54] SPOT WELDING DEVICE

[75] Inventors: Kazuo Naruse, Okazaki; Mikio Kitano; Hideaki Tobita, both of Toyota, all of Japan

[73] Assignee: Toyota Jidosha Kabushiki Kaisha, Aichi, Japan

[21] Appl. No.: 10,556

[22] Filed: Feb. 3, 1987

[30] Foreign Application Priority Data

Feb. 3, 1986 [JP] Japan ............................ 61-21533

[51] Int. Cl.$^4$ ............................................. B23K 11/10
[52] U.S. Cl. ................................ 219/86.7; 219/86.25; 219/87
[58] Field of Search ................ 219/86.1, 86.25, 86.33, 219/86.7, 87, 80, 91.2; 228/45; 901/42

[56] References Cited

U.S. PATENT DOCUMENTS 4,267,424  5/1981  Shimatake et al. .......... 219/86.25 X
4,441,645  4/1984  Takagishi et al. ................ 219/87 X
4,448,341  5/1984  Fujikawa et al. ................ 219/87 X

FOREIGN PATENT DOCUMENTS 2700602  7/1978  Fed. Rep. of Germany ........ 901/42

Primary Examiner—E. A. Goldberg
Assistant Examiner—Catherine M. Sigda
Attorney, Agent, or Firm—Finnegan, Henderson, Farabow, Garrett & Dunner

[57] ABSTRACT

A spot welding device for welding car bodies at a plurality of different positions without the need to move the car body to the welding device for each weld position. The device comprises a polyhedron shaped rotating member having a plurality of electrodes disposed on surfaces of the rotating member. The member is rotated to select a desired surface and the configuration of electrodes thereon to thereby perform a plurality of welds with the electrodes on the selected surface.

3 Claims, 4 Drawing Sheets

SPOT WELDING DEVICE

BACKGROUND OF THE INVENTION

1. Field of the Invention

The present invention relates to welding equipment, and more particularly to spot welding equipment used for welding car bodies.

2. Description of the Related Art

The bodies of automobiles comprise plate-like metal members which are generally welded by multi-spot welding using a welding jig. A robot mechanism may also be included in the welding process so that several portions can be welded at the same time to improve work efficiency. In this sort of welding equipment, as schematically shown in FIG. 8, when a car body 2 is conveyed to a welding position by a conveying means (not shown in the drawing), welding equipment, generally referred to by 47, having receiving stanchions 8 and a back electrode 42 formed on a mount 46, approaches a welding position 10. Electrode tips 27 formed on the back electrode 42 are then brought into contact with the car body 2. Upper electrodes 43 having electrode tips 28 move downward and are positioned opposite the electrode tips 27 of the back electrode 42 in the welding position 10. Car body 2 is then spot welded at the positions corresponding to oppositely facing electrode tips 27 and 28 by charging the electrode tips with electricity.

When welding a channel-like portion of a car body wherein the channel has portions of differing depths or widths, such as the portion 44 in FIG. 8, it is necessary to move the car body 2 to a second welding position to weld different portions of the car body. Thus, an intervening step of moving the car body to the electrodes is required before performing the second weld. This intervening step reduces the efficiency and cost-effectiveness of the welding process and the assembly line.

Conventional welding equipment as described above cannot perform welding at different positions in the same processing step when respective welding positions of the car body have similar form but different dimensions. Thus, an additional step in which the car body is moved to a second weld position becomes necessary. In other words, it is necessary to conduct separate steps equivalent in number to the total number of types and configuration of car bodies being welded or the number of welding positions on a car body.

SUMMARY OF THE INVENTION

It is therefore an object of the present invention to provide welding equipment which is capable of performing multiple welds in the same process step at a plurality of welding positions having similar form but differing dimensions without the need for providing intervening steps of moving the welded article.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

To achieve the foregoing object, and in accordance with the purposes of the invention as embodied and broadly described herein, there is provided a welded device for spot welding a car body mounted on a pallet. The pallet has a longitudinal aperture therein beneath the car body. The welding device comprises a polyhedron shaped rotational member having a plurality of electrodes disposed on different surfaces thereof, and a support member for supporting the rotational member in vertical alignment with the longitudinal opening in the pallet. Means are provided for rotating the rotational member to selectively position one of the surfaces of the rotational member. The device further includes means, including the support member, for vertically moving the rotational member through the longitudinal opening of the pallet to position the electrodes of the selected surface of the rotational member in a predetermined welding position.

By adopting the above structure, when a car body to be subjected to welding work is conveyed to a welding work position by a truck or pallet, electrodes disposed on the selected surface of the rotational member are selected by the rotating means. The electrodes are then brought into contact with a predetermined welding position on the car body. Upper electrodes are then brought into position opposite the electrodes of the rotational member and welding is performed by charging the upper electrodes. For a car body that has a plurality of welding positions, the rotating means selects a different surface of the rotational member corresponding to a second welding position. The electrodes of the selected surface are then positioned adjacent the car body and welding at the second position is performed as described above. In this manner welding is conducted at welding positions of a car body having similar form and different dimensions without the intervening step of moving the car body to a second welding position.

The accompanying drawings, which are incorporated in and constitute a part of the specification, illustrate a presently preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

In accordance with the present invention there is provided a welding device for spot welding a car body mounted on a pallet. The pallet has a longitudinal aperture therein beneath the car body. The welding device comprises a polyhedron shaped rotational member having a plurality of electrodes disposed on different surfaces thereof, and a support member for supporting the rotational member in vertical alignment with the longitudinal opening in the pallet. Means are provided for rotating the rotational member to selectively position one of the surfaces of the rotational member. The device further includes means, including the support member, for vertically moving the rotational member through the longitudinal opening of the pallet to position the electrodes of the selected surface of the rotational member in a predetermined welding position.

Figure 1:
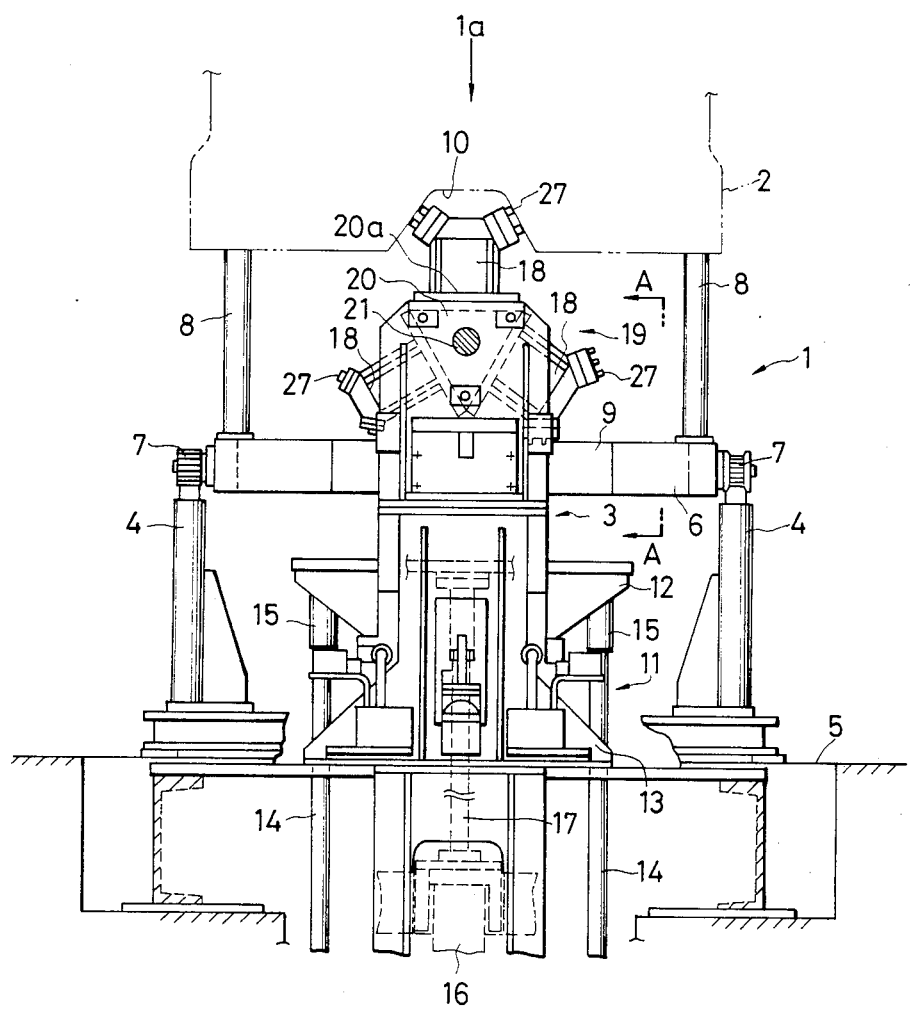
FIG. 1 is a front elevation illustrating an embodiment of a welding device incorporating the teachings of the present invention.
Figure 2:
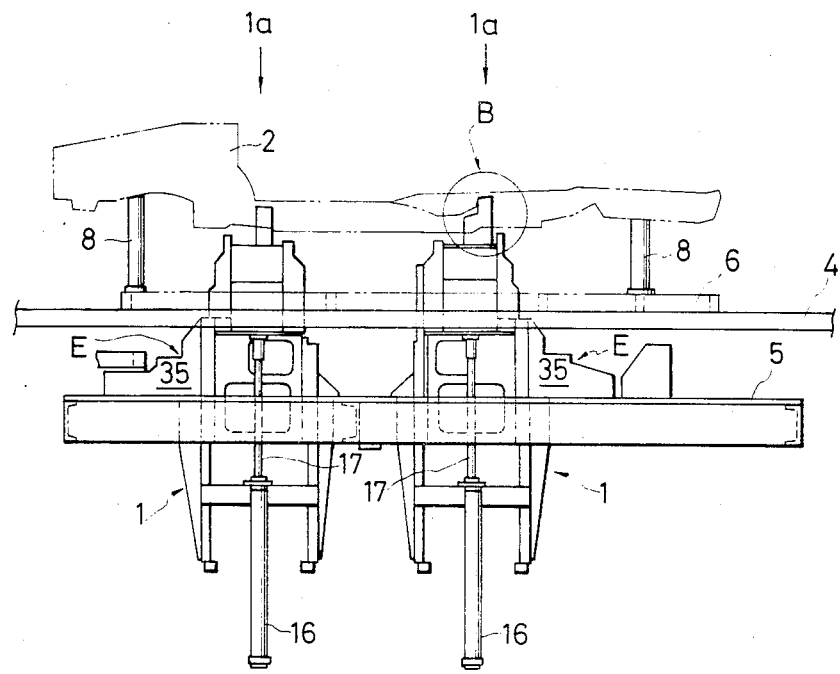
FIG. 2 is a side view of FIG. 1 illustrating two welding devices incorporating the teachings of the present invention arranged side by side at a welding station.

FIG. 1 shows a welding device 1 for car bodies. An upper electrode connected to a power source is omitted from this drawing. A lower electrode 27 serves as a ground electrode. Welding device 1 is disposed in a welding line for assembling a car body 2 of an automobile. Pallet rails 4 are laid at a certain predetermined height above a floor surface 5 over the whole length of a welding line, and a pallet 6, used as a truck for mounting the car body 2 thereon, runs on the pallet rails 4 with the aid of wheels 7 provided on the pallet. The pallet 6 has a frame structure and receiving stanchions 8 for supporting the car body 2 as shown in FIG. 2. A longitudinal opening 9 is formed in the flat portion of the pallet 6 so that a support member 3 can extend therethrough from beneath the pallet and approach a welding position 10 on the car body 2.

FIG. 1 shows the state in which support member 3 projects through the opening 9. Welding device 1 is normally positioned below the pallet 6 and extends through the opening only to perform welding.

Support member 3 is provided with a plurality of electrode portions 18 on different surfaces of polyhedron shaped rotating member 20, and the electrodes can be selectively positioned by a rotating means generally referred to as 19. As embodied herein, rotating means 19 comprises a shaft 21 extending from the rotating member 20, and a drive portion 26 comprising an assembly consisting of an electric motor 23, a drive chain 24, and gears 25. As electric motor 23 turns gears 25 through drive chain 24, shaft 21 is rotated and rotating member 20 is turned to thereby select a desired surface 20a of member 20.

Figure 5:
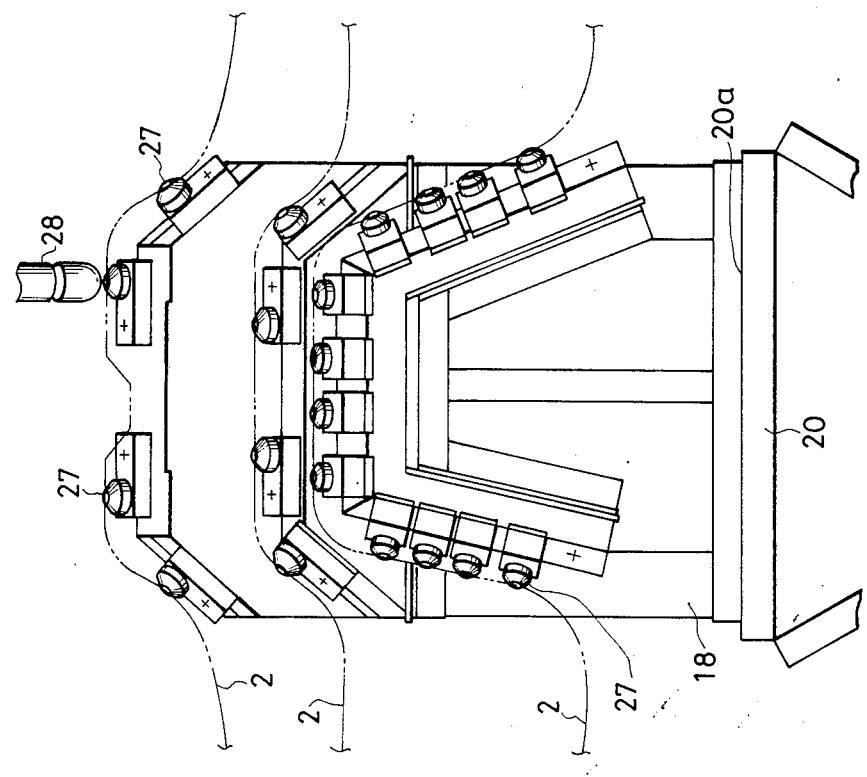
FIG. 5 is a front view of the electrode of FIG. 4 taken along the line C—C.
Figure 4:
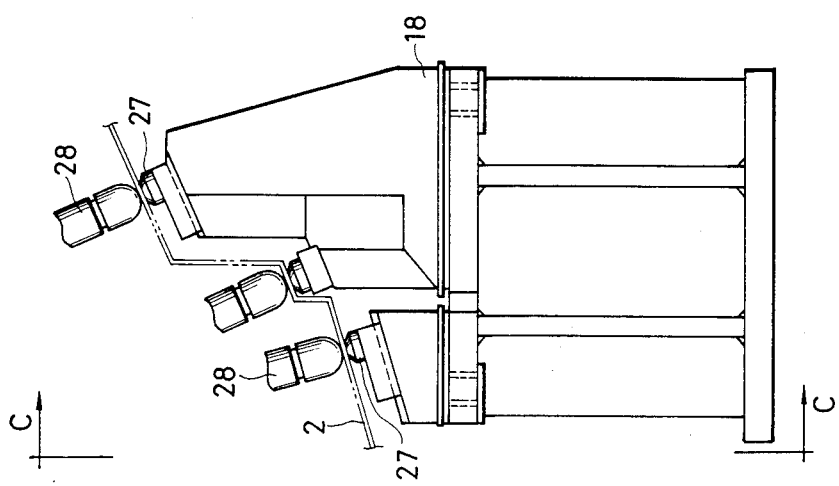
FIG. 4 is an enlarged view of an electrode incorporated in the present invention and indicated by arrow B in FIG. 2.

A plurality of electrode portions 18, which are in an electrically conductive state, are fixed to the bearing surfaces 20a on each side of the polyhedron shaped rotating member 20 mounted on support member 3. By way of example and not limitation, rotating member 20 of the present preferred embodiment comprises three surfaces having electrode portion 18 disposed thereon. Electrode tips 27 are fixed to the outer sides of the portions 18, as shown in detail in FIGS. 4 and 5. These electrode tips 27 are brought into contact with electrode tips 28 positioned on the opposite side of car body 2. Electrode tips 28 are connected to a power source (not shown).

Electrode portions 18 are respectively provided on three sides of the rotational member 20. In this three surface configuration, at least three types of electrode portions 18 can be provided for welding positions having a similar form but different dimensions corresponding to different car types, as illustrated in the channel-like welding position 10, shown in FIG. 1. The invention is not limited to three surfaces on rotating member 20, and any number of surfaces may be provided corresponding to different welding positions.

Figure 3:
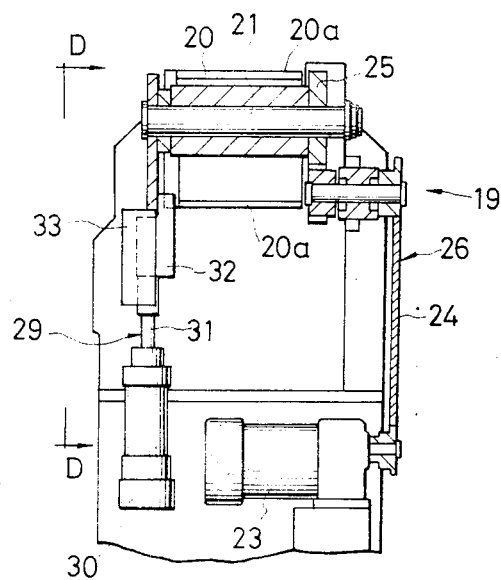
FIG. 3 is a schematic side view taken along the line A—A of FIG. 1 and looking in the direction of the arrows.
Figure 6:
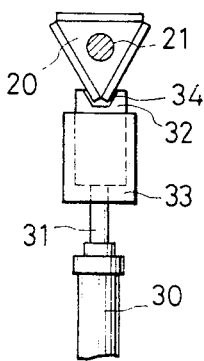
FIG. 6 is a side view of the device taken along the line D—D of FIG. 3 and illustrating an embodiment of the locking mechanism of the present invention.

The three types of electrode portions 18 are rotated by the above-described drive portion 26 and, as shown in FIGS. 3 and 6, a lock portion generally indicated as numeral 29 is provided for locking rotating member 20 in a desired position. Lock portion 29 comprises a lock cylinder 30, piston rod 31, and a lock block 32 which is slidably guided by a guide block 33 and the vertical movement of rod 31 of the lock cylinder 30. Lock block 32 is configured with a V-shaped notch therein to engage with an edge of rotational member 20, as shown in FIG. 6. The notch of lock block 32 is not limited to a V-shaped groove, but may be configured in any shape so as to mate with an edge of rotating member 20 to thereby hold the member in position.

In accordance with the invention, and referring again to FIG. 1, there is further provided means for vertically moving the rotating member 20 through the longitudinal opening 9 of the pallet 6. As embodied herein, the moving means comprises machine base 11 divided into an upper portion 12 and a lower portion 13. Support member 3 is positioned at the upper portion 12 of machine base 11. Elevator guides 14 are provided on both sides of the machine base 11 and extend vertically relative to the floor surface 5. Guides 15 are provided in upper portion 12 of machine base 11 and engage with respective elevator guides 14. A cylinder 16 is placed at the center of lower portion 13 of machine base 11 interposed between elevator guides 14. Cylinder 16 extends below the floor face 5. The end of a piston rod 17 extending from elevator cylinder 16 is connected to upper portion 12 of machine base 11 and passes through lower portion 13 so that upper portion 12 of the machine base 11 and support member 3 are moved through opening 9 with vertical movement of the piston rod 17.

Figure 7:
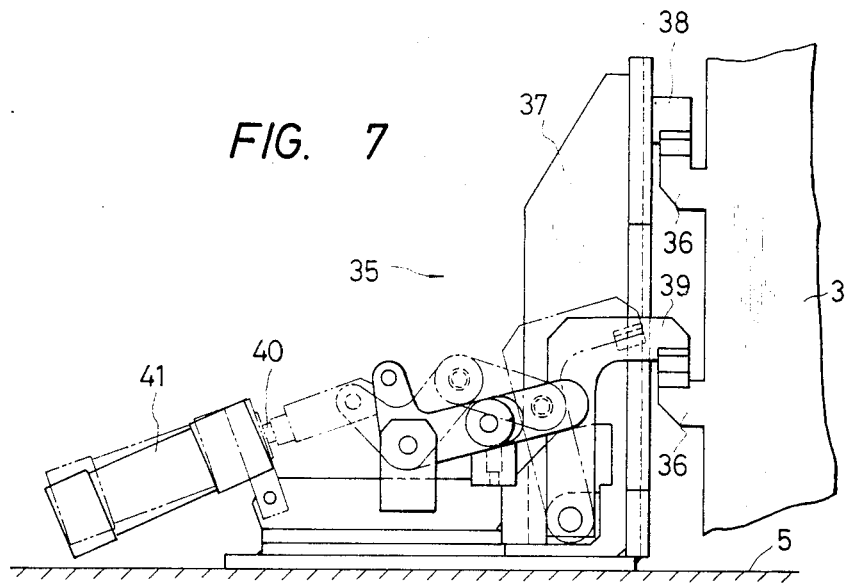
FIG. 7 is an enlarged side view of a preferred embodiment of a positioning mechanism incorporated in the present invention and indicated by arrow E in FIG. 2.
Figure 8:
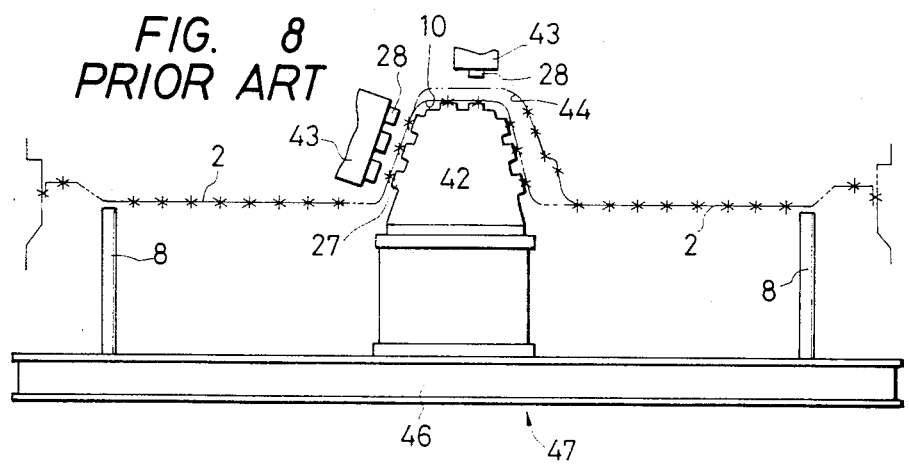
FIG. 8 is an illustration of a conventional welding device of the prior art.

As shown in FIG. 2, a locating portion 35, for locating the electrode portions 18 (FIG. 1) at two different heights relative to the car body 2, is provided on machine base 11. Locating portion 35 is interposed between pallet rails 4 and floor face 5. This locating portion 35, as shown in detail in FIG. 7, is provided adjacent support member 3. Support member 3 is provided with abutting portions 36 projecting from the side of the support member. A substantially L-shaped stop frame 37 is positioned on floor face 5 with one leg of the L-shape extending upwardly in parallel to the support 3 and facing abutting portions 36. A stop portion 38 projects from the upper portion of the side of stop frame 37 facing support member 3 and is configured to engage with abutting portion 36 to selectively position the height of support member 3 relative pallet rails 4 and car body 2.

Stop frame 37 includes a substantially L-shaped hook portion 39 rotatably supported on the lower portion of stop frame 37 by a shaft 50. Hook portion 39 is operably connected to a drive piston 40 of a drive cylinder 41 by a link mechanism 52. Hook portion 39 is rotated about shaft 50 by movement of drive piston 40 and link mechanism 52 to selectively engage and disengage abutting portions 36 to thereby adjust the vertical height of the support member 3. The position of hook portion 39, shown by the broken lines in FIG. 7, indicates the engaged and disengaged states of hook portion 39 on one of the abutting portions 36.

With two abutting portions 36 configured on support member 3 corresponding to two predetermined heights of the support member 3 relative car body 2, and three electrode surfaces on rotational member 20, it is possible to weld six similar forms corresponding to six differently dimensioned welding positions with a single welding device without moving the car body.

As shown in FIG. 2, when a plurality of welding devices 1, each provided with rotating members 20 each having electrode portions 18 on the surfaces thereof, are arranged adjacent one another on an assembly line, the number of different types of welding positions are increased.

The operation of the welding device 1 will not be described. Initially, the support 1 shown in FIG. 3 is placed in a position below the pallet 6 by retracting the piston rod 17 of elevator cylinder 16. As shown in FIGS. 1 and 2, the car body 2 is mounted on the pallet 6 and conveyed to the welding position, indicated by arrows 1A, in which welding of position 10 on car body 2 is accomplished. Then, hook portion 39 is rotated about shaft 50 by link mechanism 52 to disengage hook portion 39 from abutting portion 36. After disengaging, the support member 3 is moved vertically to a new predetermined height. The predetermined heights of the support member 3 are selected based upon the depth of the welding position 10.

When piston rod 17 of elevator cylinder 16 is actuated, the upper portion 12 and support member 3 project through the opening 9 of the pallet 6 and reach a predetermined position by the rising of the piston 17 of the cylinder 16. Then, the rotational member 20 is rotated by the drive portion 26 and a desired surface of the member 20 and corresponding electrode portion 18 is selected, as shown in FIGS. 3 and 6. Next, the lock cylinder 30 is actuated and the rotational member 20 is fixedly positioned by the engagement of the V-shaped groove 34 of the lock block 32 with a corner of the polyhedron shaped rotational member 20. The elevator cylinder 16 is again actuated and the support 3 is moved upwardly to position electrode tips 27 of electrode portions 18 adjacent welding portions 10 of the car body 2. At the same time, the abutting portions 36 of the support 3 engage either the stop portion 38, the hook portion 39 or both depending on the selected height of the support member 3. The electrode tips 28 on the side of a power source (not shown in the drawings) are moved downwardly opposite the tips 27 and welding work is performed by electrically charging the electrode tips 28.

To select a second surface of the rotational member 20, the member is separated from the welding portion 10 by actuating the elevator cylinder 16 and downwardly moving the support member 3. The lock block 32 is then moved downwardly to disengage the groove 34 with the corner of the rotational member 20. Then, the rotational member 20 is rotated by the drive portion 26 and another selected surface 20a and electrode portion 18 is chosen. The lock block 32 is then moved upwardly and a different corner of rotational member 20 is engaged by groove 34. During this time, another welding portion 10 of the car body 2 or another car body is selected. Then, the support 3 is again moved upwardly and welding work is continued as described above.

The operation of the welding device 1 described above may be controlled by a sequence controller of the type well known in the art. The sequence controller selects electrode portions 18 of a selected surface 20a of member 20 in accordance with the type of car body being welded and the configuration of the car body. The upper electrode portions 28 may be positioned with a robot mechanism or any device or apparatus capable of selectively moving the upper electrodes into and out of abutment with the car body. Although the embodiment of the present invention relates to a channel-like welding portion 10, the invention is not limited to this type of car body configuration and may be used the other configurations. Moreover, it is possible to increase the number of welding positions 10 accessible with welding device 1 by increasing the number of stop portions 38 and abutting portions 36 on support member 3 and locating portion 35 to thereby increase the number of different heights where the welding device is operable.

Furthermore, the present preferred embodiment is so configured that the rotating member moves vertically passing through the opening 9 of the pallet 6. However, the pallet 6 may also be formed into a saddle in the direction of the movement of the car body to thereby eliminate the need for vertical displacement of the rotating member.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A welding device for spot welding a car body mounted on a pallet having a longitudinal aperture therein, the welding device comprising:
    a polyhedron shaped rotational member having a plurality of electrodes disposed on different surfaces thereof;
    a support member for supporting said rotational member in vertical alignment with a longitudinal opening in a pallet;
    means for rotating said rotational member to selectively position one of the surfaces of said rotational member; and
    means, including said support member, for vertically moving said rotational member through the longitudinal opening of said pallet to position the electrodes of said selected surface of said rotational member in a predetermined welding position.

2. The welding device of claim 1, wherein said rotating means comprises:
    a shaft connected to said rotational member;
    gear means engaged to one end of said shaft; and
    an electric motor operably engaged with said gear means for driving said gear means and rotating said shaft.

3. The welding device of claim 1, further including a lock block having a recessed portion for physically engaging a corner of said polyhedron shaped rotational member, said lock block being effective to lock said rotational member in said selected position; and
    means for moving said lock block into and out of engagement with said rotational member.

* * * * *